(12) United States Patent
Sundaravel et al.

(10) Patent No.: US 7,127,068 B2
(45) Date of Patent: Oct. 24, 2006

(54) GEOGRAPHICAL COMPARISON SYSTEM AND METHOD

(75) Inventors: Vale Sundaravel, Framingham, MA (US); Benjamin J. Paul, Winchester, MA (US)

(73) Assignee: Info Space, Inc., Bellevue, WA (US)

( * ) Notice: Subject to any disclaimer, the term of this patent is extended or adjusted under 35 U.S.C. 154(b) by 692 days.

(21) Appl. No.: 09/863,538

(22) Filed: May 23, 2001

(65) Prior Publication Data

US 2001/0055393 A1    Dec. 27, 2001

Related U.S. Application Data

(60) Provisional application No. 60/213,013, filed on Jun. 21, 2000, provisional application No. 60/206,738, filed on May 24, 2000.

(51) Int. Cl.
*H04K 1/00* (2006.01)
*G08G 1/01* (2006.01)
*G01C 21/28* (2006.01)
*G01C 21/30* (2006.01)

(52) U.S. Cl. ............... 380/258; 340/905; 340/933; 701/207; 701/212; 701/213

(58) Field of Classification Search ............ 340/7.1, 340/825.37, 995.12; 380/271, 258; 342/450, 342/451
See application file for complete search history.

(56) References Cited

U.S. PATENT DOCUMENTS

| | | | | |
|---|---|---|---|---|
| 5,754,657 | A | * | 5/1998 | Schipper et al. ............ 380/258 |
| 5,903,653 | A | * | 5/1999 | Ross et al. .................. 380/271 |
| 5,953,722 | A | * | 9/1999 | Lampert et al. ............ 707/100 |
| 5,991,739 | A | | 11/1999 | Cupps et al. ................. 705/26 |
| 6,107,944 | A | * | 8/2000 | Behr et al. ............. 340/995.12 |
| 6,157,317 | A | * | 12/2000 | Walker ...................... 340/7.1 |
| 6,181,253 | B1 | * | 1/2001 | Eschenbach et al. ... 340/825.37 |
| 6,249,252 | B1 | * | 6/2001 | Dupray ....................... 342/450 |

* cited by examiner

*Primary Examiner*—Gilberto Barrón, Jr.
*Assistant Examiner*—A Nobahar
(74) *Attorney, Agent, or Firm*—Olympic Patent Works PLLC

(57) ABSTRACT

Systems and methods to create venue tokens that provide generalized geographic information while preserving location specific data. In one embodiment, a Universal Location Descriptor (ULD) translator converts location data into a geocode that in one embodiment is a binary code. Location information can include a street address, zip code, directional information, destination, velocity information, latitude and/or longitude, etc. The geocode can then be encrypted to generate a token. Relative geographic similarities can be identified by comparing geographic information from the tokens, thereby allowing similarly situated individuals and/or organizations, service providers, etc., to be identified without disclosing specific location identities of those parties seeking such privacy. The comparison of token geographic information can provide a probabilistic output that, in one embodiment, can be customized using an application-dependent threshold, to generate only those outputs satisfying a specified probability measure.

20 Claims, 4 Drawing Sheets

GEOGRAPHICAL COMPARISON SYSTEM AND METHOD

CLAIM OF PRIORITY

This application claims priority to U.S. Ser. No. 60/206,738, entitled "Venue Encryption Apparatus and Method", filed on May 24, 2000, naming Vale Sundaravel and Benjamin J. Paul as inventors, the contents of which are herein incorporated by reference in their entirety, and this application also claims priority to U.S. Ser. No. 60/213,013, entitled "Discrete Location Encoder", filed on Jun. 21, 2000, naming Vale Sundaravel and Benjamin J. Paul as inventors, the contents of which are also herein incorporated by reference in their entirety.

CROSS-REFERENCE TO RELATED APPLICATIONS

This patent application is co-pending with a related patent application entitled "Location Encoder", having the same inventors as this patent application and filed concurrently herewith, the contents of which are incorporated herein by reference in their entirety.

BACKGROUND

1. Field

The methods and systems relate generally to encryption systems and methods, and more particularly to encrypting geographic or location data.

2. Description of the Prior Art

The increase in internet popularity among the general public is responsible for a tremendous focus on electronic commerce, or e-commerce. As consumers are aware, as commerce evolves, so does advertising. Certain businesses have consequently developed techniques to profile internet users, wherein the user profiles can thereafter be sold to internet advertisers. Some of these profiles are generated using information voluntarily provided by internet users, while other profiles are generated using "cookies" or other tracking techniques that are impervious to the internet user. Such unknowing use of involuntary information has spawned great debate regarding privacy issues. As the number of electronic devices increases, it is expected that the privacy concerns will similarly increase.

One such concern for privacy involves a pending regulation that requires cellular phones to be equipped with self-locating information for emergency calls to 911. Such location information is standard in the non-mobile phone industry, thereby allowing law enforcement or other emergency personnel to quickly locate an emergency caller. Although the intent of the regulation for cellular phones is admirable in striving for increased emergency personnel response to cellular phone users, there are concerns that the location information provided in the location identification technology can be intercepted and utilized as profiling information in the form of geographic tracking, for example. As the numbers of cellular and other wireless and network-connected devices increases, and the uses for such devices similarly expands, this privacy concern may achieve greater weight.

There is currently not an efficient apparatus or method to convert geographic data to provide generalized location information without divulging specific location information.

What is needed is a system and method that protects specific location data while providing generic geographic information.

SUMMARY

The systems and methods herein convert geographic information into an encrypted token that can be compared to other such encrypted tokens to allow general geographic information comparison, while protecting location specific information and hence privacy. In one embodiment, the result of the geographic comparison is a distance measure. The geographic location can include latitude/longitude data, street address data, destination data, directional data (north, south, east, west, north-east, south-west, etc.), zone information, or other traditional, useful location data. In one embodiment, the data can be input to a Universal Location Descriptor (ULD) translator or generator that translates the location data into a ULD or "geocode", that in some embodiments, can be a binary code. The geocode can be compared to other geocodes to provide geographic comparison. The geocode can also be encrypted into a token that can also be compared to other such encrypted tokens. In some embodiments, the tokens can allow generalized geographic commonalities to be identified without indicating specific location information. In one embodiment, services such as gasoline stations, restaurants, grocery stores, etc., can subscribe to a provider by contributing geographic information for token generation. The provider can generate and maintain a token database(s) for many types of services. Consumers can similarly provide tokenized geographic information to the provider, whereupon the provider can perform the token comparison to inform the consumer of the services of interest in the consumer's general area. In an embodiment, neither the provider, nor the services, can decipher the exact location of the consumer, while the consumer is provided with the desired service information in the respective consumer geographic area. Such data exchange can therefore occur without infringing on the consumer's privacy. In one embodiment, the token comparison process can provide a probabilistic measure that can be further filtered using a specified threshold value.

In one embodiment, the systems and methods respond to a request for geographically relevant data, wherein geographically relevant data includes data that can be restricted or otherwise categorized according to some geographic criteria that can include a radius, a distance, a direction, etc. For example geographically relevant data can include gasoline stations within a ten mile radius of a given location.

Other objects and advantages of the will become more obvious hereinafter in the specification and drawings.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the methods and systems described herein.

Figure 1:
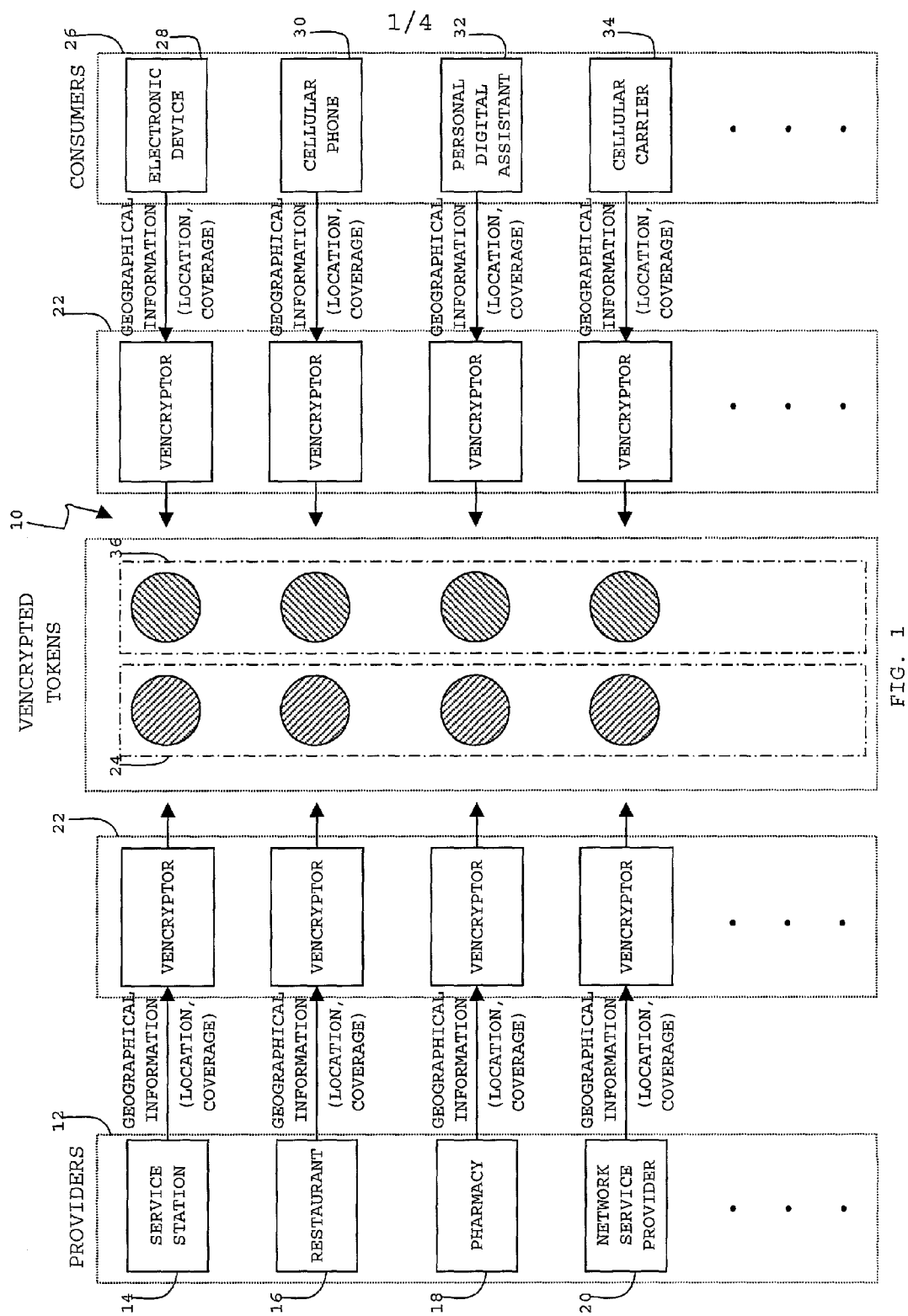
FIG. 1 is an architectural system diagram of the venue token generation process.

Referring now to FIG. 1, there is a block diagram 10 of a system as related to the generation of venue tokens, wherein venue tokens can generated from a variety of sources that can be referenced herein collectively as providers 12. A provider 12 can be understood as an entity with a geographic location that can be referred to or described either individually (e.g., "McDonald's") or collectively (e.g., "Restaurant", "Fast Food", "Hamburgers"). In some embodiments, such as an embodiment illustrated by FIG. 1, providers 12 can be suppliers of services of goods, whether such goods are at wholesale, consumer, or other levels. As used herein, geographic information can be understood to include information that can relate to a location or reference to a reference or coordinate system, using a reference system within the coordinate system, and includes but is not limited to one or more of addresses, parcel numbers, wards, plot numbers, zip codes, area codes, Is latitude, and/or longitude, etc.

In the illustrated embodiment of FIG. 1, the providers 12 are service stations 14, restaurants 16, pharmacies 18, network service providers 20, and other similar providers, for which the aforementioned providers merely serve as a representative and not an exhaustive example. For the purposes of the methods and systems disclosed herein, a provider 12 can also be understood as an entity that can be associated with geographic information as defined herein.

In the embodiment of FIG. 1, the providers 12 can be equipped with a "vencryptor" 22 that translates the specific provider's geographic information into a corresponding venue token 24, hereinafter referred to as a vencrypted token. An alternate embodiment can include a configuration wherein a single vencryptor 22 collects geographic inputs from the multiple providers 12. The vencryptor 22 can therefore be incorporated locally and be in local communication with a particular provider 12 or set of providers in a wired or wireless networked environment, or the vencryptor 22 can be accessed over a non-local network in wired or wireless configuration. In the FIG. 1 embodiment, provider vencrypted tokens 24 are stored in a database that can be located at a central processing location; however, an alternate storage mechanism can be utilized, and the methods and systems herein are not limited by such storage mechanism or medium, or the location of such database or storage mechanism. For example, only select vencrypted tokens 24 may be saved in one embodiment, or multiple databases may be utilized to save the vencrytped tokens 24. These multiple databases can be organized and further subdivided using one or more of many different categories, including for example, geographic location, provider-type, etc., with such examples provided for illustration rather than limitation. Those with ordinary skill in the art will recognize that such a database, and other databases referred to herein, can be a memory having one or more physical or logical partitions and/or segments, and can optionally and additionally utilize one or more of well-known database packages including MySQL, SQL, Oracle, Informix, etc., with such examples provided merely for illustration and not limitation.

In an embodiment, vencyptor tokens related to a particular provider can be stored locally at the provider 12, and transmitted upon receiving a request that can utilize the token.

FIG. 1 also depicts an array of anticipated consumers 26. As shown by FIG. 1, the consumers 26 can be identified by communication devices typically utilized by consumers. The illustrated consumers 26 are intended to exemplify modes of accessing networked data, and such access methods can be wired or wireless, through an Internet Service Provider, T1 link, or other such networking or communications scheme. The network can be the internet, a cellular phone network, or other communications system, wherein such networks can utilize protocols such as Internet Protocol (IP) or Wireless Application Protocol (WAP), although such examples are provided merely for illustration and not limitation. Examples of such consumers 26 can include an electronic device 28 such as a personal computer, a cellular phone 30, a personal digital assistant 32, or a cellular carrier 34. Just as with the providers 12, the list of consumers 26 provided herein is merely representative of a list of devices owned or operated by individuals or entities seeking information. For the purposes of the discussion herein, consumers 26 can therefore be understood as an entity or individual having an association with geographic information as defined herein. Those with ordinary skill in the art will recognize that a consumer 26 can be a provider 12, and vice-versa, for the illustrated systems and methods.

In the FIG. 1 embodiment, consumer devices connect to a vencryptor 22 that accepts geographic information from the respective consumer 26 to generate a vencrypted token for the consumer 36. In the embodiment illustrated in FIG. 1, wherein consumers 26 can be equipped with dedicated vencryptors 22, such a configuration can allow integration of the various consumers 26 and vencryptor devices 22 into a single module. In an alternate embodiment, multiple consumers 26 can access a single vencryptor 22, that can be, for example, incorporated into a particular network, cellular carrier service, etc. The vencryptor 22 can intercept the geographic information from the consumers 26, and process the respective consumer geographic information to form vencrypted tokens 36. Vencryptors 22 can hence be accessed through a local or non-local network, using wired or wireless communications links and protocols as necessary. Vencryptor tokens for consumers 26 can also be stored in a database 36 that can be centrally located or stored locally and transmitted with a request from a consumer.

Figure 2:
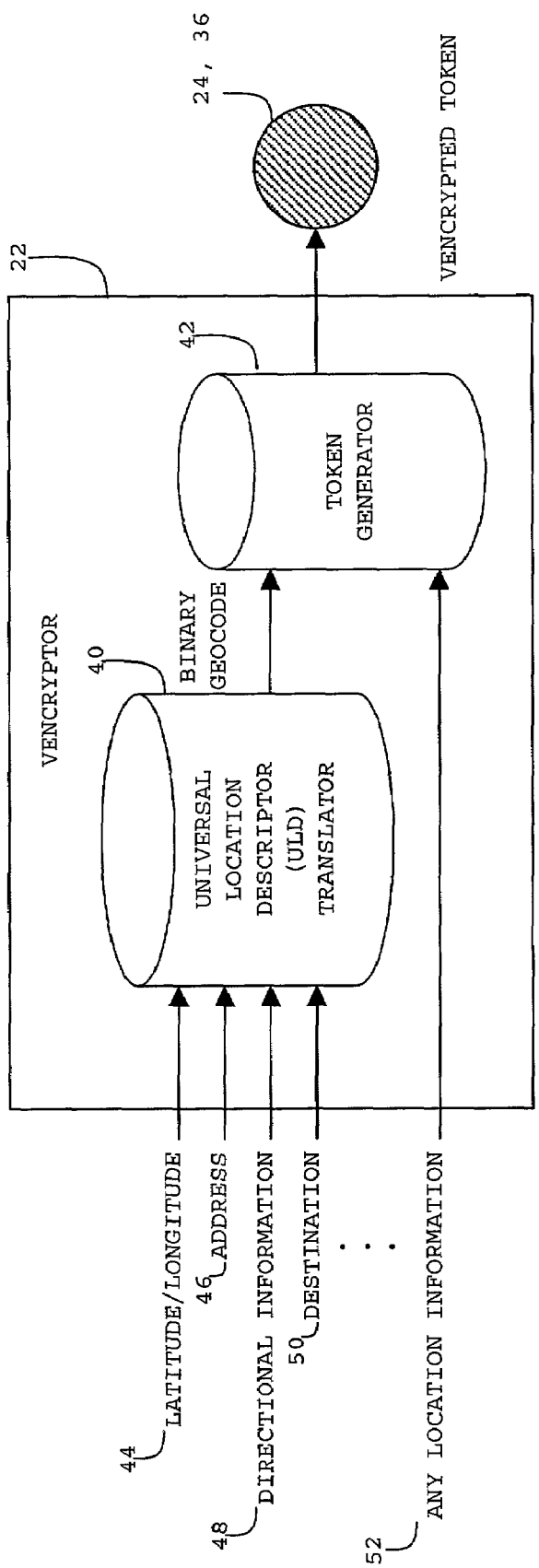
FIG. 2 is a diagram of a system that can be utilized to generate the venue tokens of FIG. 1.

Referring now to FIG. 2, there is a detailed diagram of the vencryptor 22 from FIG. 1. The illustrated vencryptor 22 includes a Universal Location Descriptor (ULD) translator 40, and a Token Generator 42. Those with ordinary skill in the art will recognize that the illustrated vencryptor 22 of FIG. 2 is merely provided for discussion purposes and is not intended as a limitation of the functionality or structure of a vencryptor 22. As shown by FIGS. 1 and 2, the vencryptor 22 can accept geographic information that can be latitude/longitude 44, address information 46 that includes street, state, and/or zip code, directional information 48, destination address information 50, or another type of geographical information as described herein previously or as otherwise understood by one of ordinary skill in the art. Such information can be input to the illustrated ULD generator 40 that translates the geographic information into a geographic code, or geocode. In the FIG. 2 system, a geocode can be represented as a binary number such that different positions in the binary number relate to different geographical precisions, although those with ordinary skill in the art will recognize that the geocode can be represented in other formats. In an embodiment according to FIG. 2, the binary geocode can be sixty-four bits, however other geocode precisions can be used.

For the illustrated systems and methods that utilize a binary geocode wherein different positions in the binary number relate to different geographical precisions, two geocodes can be compared to provide a geographic comparison without revealing geographic information. In one embodiment, the comparison can be performed using a bitwise operation such as an exclusive OR (XOR) operation, although such an embodiment is provided for illustration and not limitation. The output of the comparison operation can be a distance measure.

For the illustrated system, a geocode can be input to the illustrated Token Generator 42 that encrypts the geocode to form a vencrypted token 24, 36. The illustrated Token Generator 42 can encrypt or otherwise mask the geocode according to location information 52 that can also be provided to the Token Generator 42, although such information may not be utilized in all embodiments. For example, geographic information 44, 46, 48, 50 with regard to a consumer can be very specific, allowing a high degree of certainty in creating the geocode; however, a consumer 26 may provide a request that may not require such a high precision. In such instances, the additional location information 52 can indicate that the more precise information in the geocode can be encrypted, masked, eliminated, etc. Those with ordinary skill in the art can therefore recognize that the methods and systems can allow encryption by masking or otherwise eliminating accuracy or precision of the geocode, thereby protecting the privacy of a location to which the geocode corresponds.

For example, one system and method that can represent the illustrated ULD generator 40 to generate a binary geocode includes the system and method disclosed in a co-pending, related application entitled "Location Encoder," the contents of which are herein incorporated by reference, wherein the geocode is a binary representation of geographical information. In an embodiment using this representation, geographical information can be represented to an accuracy of sixteen one-hundredths square-inches, although such accuracy may not be required of all applications. Accordingly, a consumer request can be a request for precision on the order of square miles or tens of miles. In such an embodiment, the sixteen one-hundredth square-inch precision, and perhaps other levels of precision, can be masked, encrypted, etc., to a precision level based on the request.

The Token Generator 42 can also provide a generic encryption scheme known to those of ordinary skill in the art, to additionally and optionally encrypt the geocode. In some embodiments, the illustrated Token Generator 42 can provide multiple forms of encryption.

As FIG. 2 indicates, in some embodiments, geographic information can be transferred directly to the Token Generator 42, thereby bypassing the ULD translator 40.

Figure 3:
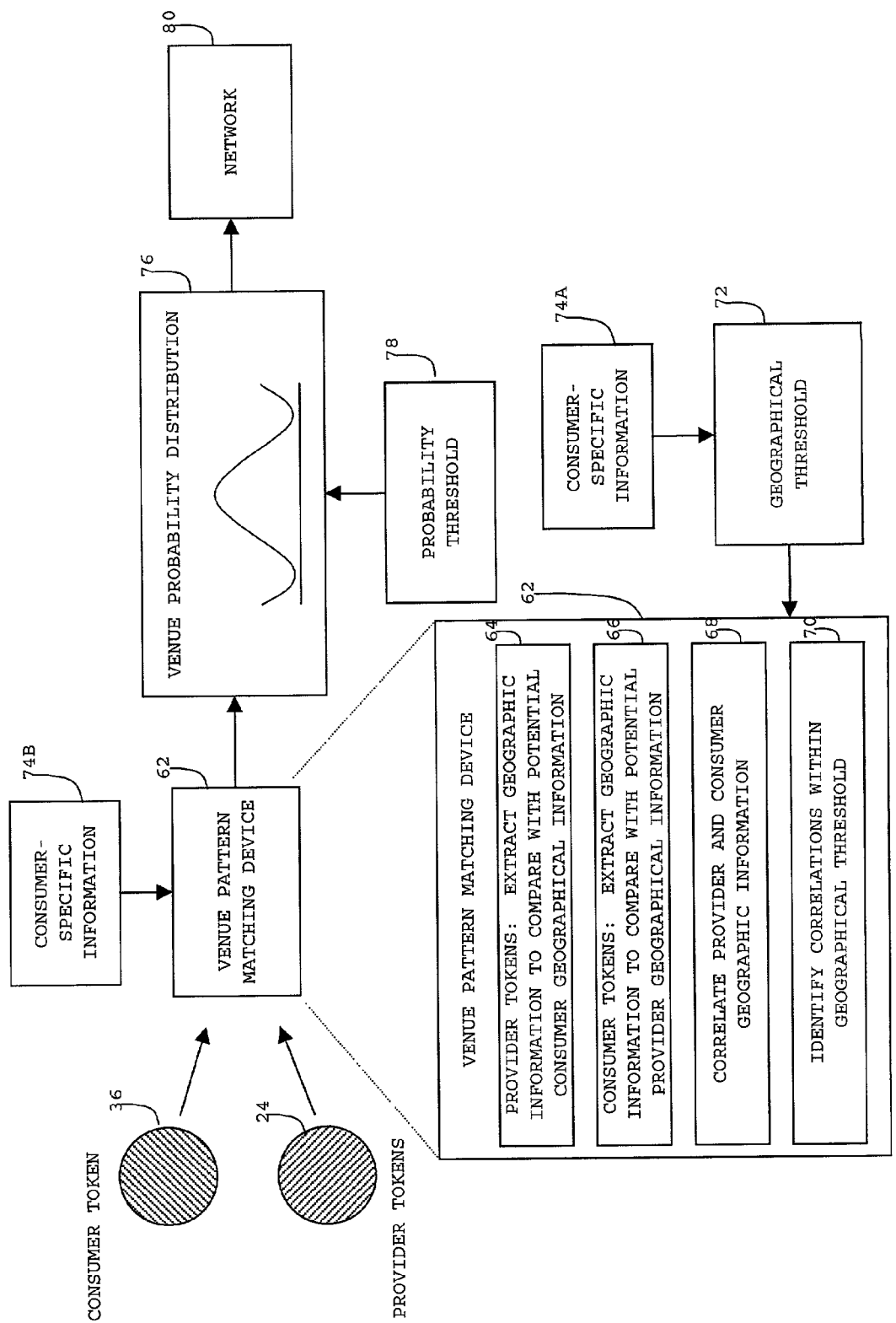
FIG. 3 is a diagram of venue token processing that can occur after the generation and collection process indicated by FIG. 1; and, FIG. 4 presents an illustrative system utilizing venue tokens in processing a request for services.

Referring now to FIG. 3, there is an illustrative system 60 wherein the vencrypted tokens can be processed. As FIG. 3 indicates, an illustrated Venue Pattern Matching Device (VPMD) 62 can process a received consumer vencrypted token 36 against the provider vencrypted tokens 24. The illustrated VPMD 62 can extract the geographic information from the provider and consumer tokens 64, 66, correlate the geographic information 68, and identify 70 those consumer and provider associations that can be within a specified geographic threshold 72. In the FIG. 3 system, the geographic threshold 72 can be fixed, can vary according to a system manager or other administrator, or can vary depending upon consumer specified information 74a. In the FIG. 3 system, the correlation performed can be, for example, in response to a request received by the consumer, e.g., "restaurants" within a given proximity of the present location of the consumer.

In an embodiment according to FIG. 3, consumer-specific information 74b, for example, home address, telephone number, demographic data, work address, etc., can be input to the VPMD 62 in performing the correlation function. Consumer-specific information 74b can increase or decrease the geographic correlations that might otherwise occur without such information 74b. Additionally, as FIG. 3 indicates, consumer-specific information 74a in specifying a geographic threshold 72 can also increase or decrease the geographic correlations that might otherwise occur without such additional and/or optional information.

The illustrated VPMD 62 can provide as output a confidence measure, illustrated in FIG. 3 as a probability 76, that represents a comparison between a consumer token 36 and a provider token 24 relative to the aforementioned processing. In some embodiments, the probability 76 can be based on the degree of accuracy to which the geographic information can be known. For example, if the geographic information includes less precise information such as a zip code or area code, without further information, the geocodes and hence the vencrypted tokens 24, 36, for the consumer and/or providers can be associated with varying degrees of uncertainty relative to the request, depending upon the desired precision of the request. In an example, a certainty of determining a restaurant (e.g., provider) within five miles of the consumer, when the consumer's (and/or provider's) location can only be identified to a precision on the order of 10 square miles, can be different from the certainty when the consumer's (and/or provider's) location can be identified to a precision of 1 square mile.

As a further illustration, consider an example where the geographical information associated with a request includes a zip code. In one embodiment, a geocode can be computed using the centroid of the zip code. Without further information from the consumer, an uncertainty can be associated with the exact location of the consumer within the zip code. In one embodiment, more precise aspects of the geocode can be masked based on the uncertainty.

In the illustrated systems, the vencrypted token comparison can be understood to be a correlation, although other comparison operations can be used. In one embodiment, a system manager or other administrator can establish a probability threshold 78 that can filter the Venue Probability Distribution 76 to provide outputs that compare to the threshold 78. In an embodiment, the probability threshold 78 can be constant, or the probability threshold 78 can be variable. For the FIG. 3 systems, provider vencrypted tokens 24 within the specified probability threshold 78 can be returned as an output of the FIG. 3 system to the network 80.

Figure 4:
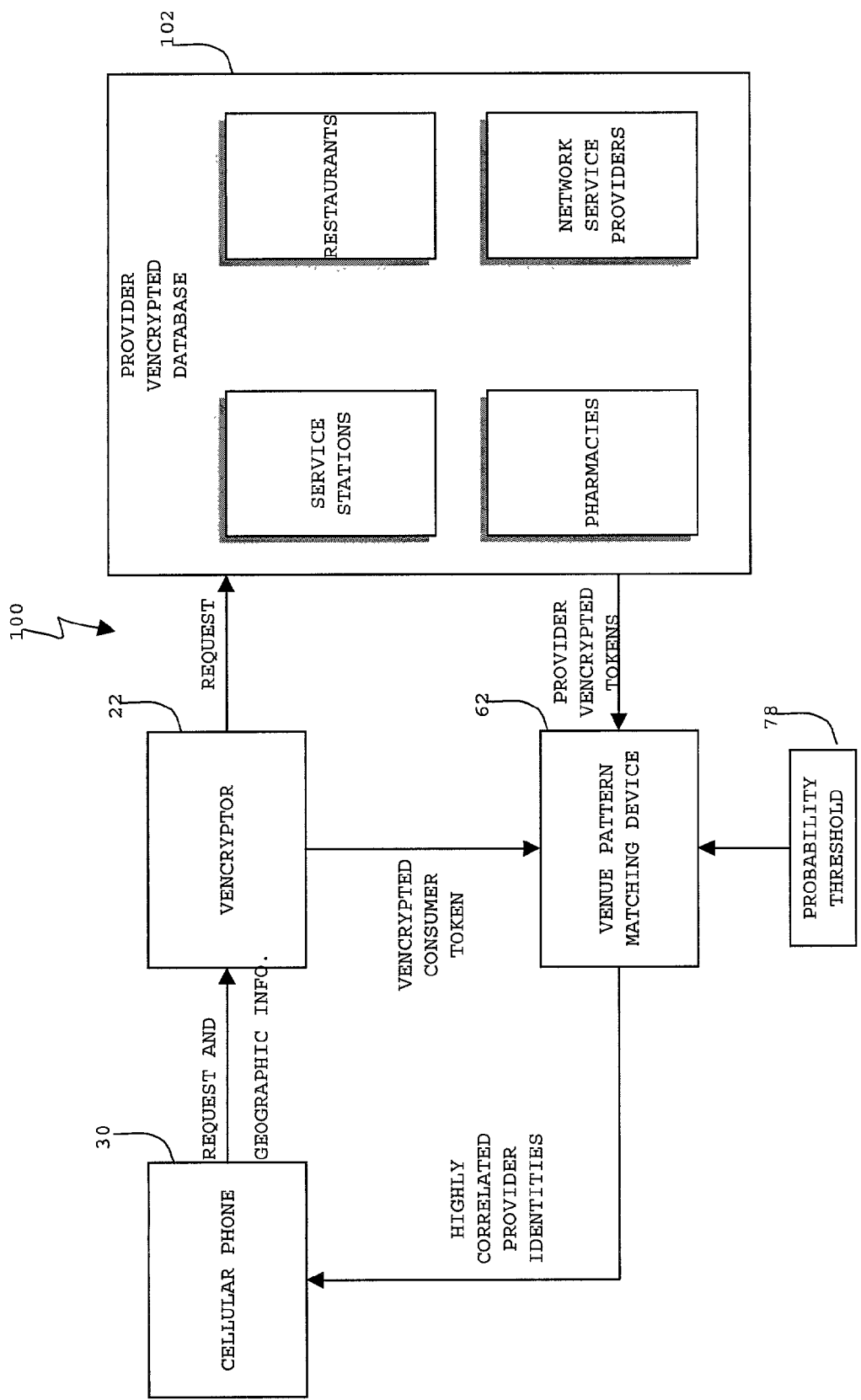

Referring now to FIG. 4, there is an illustrative system 100 that utilizes the features of FIGS. 1–3 for processing a service request from a consumer that is, in FIG. 4, a cellular phone 30. A cellular phone user can enter a request for information with associated geographic information, to the cellular phone 30, and that information can be transmitted, transferred, etc., to a vencryptor 22. The geographic information can be entered by the user, or additionally and optionally, can be provided by a device otherwise incorporated into the cellular phone 30 or integrated to operate with the cellular phone 30. In the FIG. 4 system 100, the vencryptor 22 is a separate device from the cellular phone 30, although the two devices can be integrated in other embodiments. The vencryptor 22, for example, can reside on a server that is separate from the cellular phone 30, or the vencryptor 22 can be a processor and/or set of instructions that is incorporated into the cellular phone 30. The vencryptor 22 can convert the geographical information to a vencrypted token, and transmit the vencrypted consumer token to the VPMD 62. In the FIG. 4 system 100, the vencryptor can parse the request information from the geographical information, and can transmit the request to the Provider Vencrypted Database 102, although those with ordinary skill in the art will recognize that a separate device can perform the parsing. The illustrated Provider Vencrypted Database 102 can maintain separate databases according to request type, although a single database can also be utilized. Those with ordinary skill in the art will recognize that the systems and methods herein are not limited to the format, arrangement, or type of database that can be represented as the Provider Vencrypted Database 102. For example, the illustrated Provider Encrypted Databases 102 can include vencrypted tokens for registered providers in that service industry, wherein the vencrypted tokens were generated using the process described in FIGS. 1 and 2. In the FIG. 4 system 100, the Provider Vencrypted Database tokens can be stored with the respective unencrypted geographic information and unencrypted identity information.

Depending upon the consumer request, the Provider Vencrypted Database 102 can provide the VPMD 62 with the corresponding provider vencrypted tokens and the associated unencrypted geographic and identity information. For example, if the consumer request is for restaurants, the illustrated Provider Encrypted Database 102 can provide the VPMD 62 with provider vencrypted tokens relating to the restaurant database. The illustrated VPMD 62 can then compare and/or correlate the vencrypted consumer token with the provider vencrypted tokens, and utilize the probability threshold 78 to identify those provider tokens having a probability of a geographic location within a certain threshold of the consumer token. The illustrated VPMD 62 can extract the unencrypted geographical and identity information associated with such identified provider tokens, and transmit such information to the cellular phone 30 as a list of highly correlated provider identities, responsive to the initial request. In the example, such provider identities can correspond to restaurants, for example, in the geographic area provided by the cellular phone 30. The cellular phone 30 is therefore provided with geographically relevant data without divulging specific geographic information to the VPMD 62 or the Provider Vencrypted Database 102. The VPMD 62 need not decrypt the consumer information, but can merely compare the encrypted tokens.

The FIG. 4 system 100 is merely one illustration, and certain features can be eliminated or combined to achieve the same effect. For example, with respect to FIG. 4, the vencryptor 22 can communicate the vencrypted consumer token to the Provider Vencrypted Database 102. The Provider Vencrypted Database 102 can perform some pre-filtering of the provider vencrypted tokens before transmission to the VPMD 62 (e.g., provide tokens based on limited geographic area as opposed to all tokens in a given request database). Similarly, the request information may not pass through the vencryptor 22, and may proceed directly to the Provider Vencrypted Database 102.

One advantage of the methods and systems over the prior art is that the vencrypted tokens protect the privacy of the consumer while providing geographically relevant data.

What has thus been described are systems and methods to create venue tokens that provide generalized geographic information while preserving location specific data. In one embodiment, a Universal Location Descriptor (ULD) translator converts location data into a geocode that in one embodiment is a binary code. Location information can include a street address, zip code, directional information, destination, velocity information, latitude and/or longitude, etc. The geocode can then be encrypted to generate a token. Relative geographic similarities can be identified by comparing geographic information from the tokens, thereby allowing similarly situated individuals and/or organizations, service providers, etc., to be identified without disclosing specific location identities of those parties seeking such privacy. The comparison of token geographic information can provide a probabilistic output that, in one embodiment, can be customized using an application dependent threshold, to generate only those outputs satisfying a specified probability measure.

The techniques described herein are not limited to a particular hardware or software configuration, and may find applicability in many computing or processing environments. The techniques can be implemented in hardware or software, or a combination of hardware and software. The techniques can be implemented in one or more computer programs executing on one or more programmable computers that include a processor, a storage medium readable by the processor (including volatile and non-volatile memory and/or storage elements), one or more input devices, and one or more output devices.

The computer program(s) is preferably implemented in one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

Although the methods and systems have been described relative to a specific embodiment thereof, they are not so limited. Obviously many modifications and variations may become apparent in light of the above teachings. For example, the functionality represented by the different functional blocks presented in the illustrative figures can be combined. Any useful geographical information can be utilized, or information that can be translated into geographical information (e.g., zip code). The vencryptors can be centrally located, incorporated into individual devices, or a system can use a combination of such configurations. The vencryption devices can additionally be accessed via a wired or wireless communications network, including the internet, using one or more of many well-known communications protocols. Although a list of providers was listed including service stations, restaurants, pharmacies, network service providers, etc., an item, information, etc., that has associated geographic information can qualify as a provider.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method for comparing a first location and a second location, the method comprising,
generating a first binary representation from geographic information based on the first location,
generating a second binary representation from geographic information based on the second location,
associating an uncertainty with at least one of the first binary representation and the second binary representation,
bitwise comparing the first binary representation and the second binary representation, and,
associating an uncertainty with the bitwise comparison.

2. A method according to claim 1, wherein an uncertainty associated with the first binary representation is based on the geographic information based on the first location.

3. A method according to claim 1, wherein an uncertainty associated with the second binary representation is based on the geographic information based on the second location.

4. A method according to claim 1, where the uncertainty associated with the bitwise comparison is based on the uncertainty associated with at least one of the first binary representation and the second binary representation.

5. A method according to claim 1, further including:
associating the bits of the bitwise comparison to derive a distance measure.

6. A method according to claim 1, further including,
encrypting at least one of the first binary representation and the second binary representation,
and wherein performing a bitwise comparison further includes performing a bitwise comparison of at least one of the encrypted first binary representation and the encrypted second binary representation.

7. A method according to claim 1, further including,
receiving a criteria, and
comparing the bitwise comparison to the criteria.

8. A method according to claim 1, further including,
receiving a criteria, and
comparing the distance measure to the criteria.

9. A method according to claim 1, further including,
receiving a probability threshold, and,
comparing the bitwise comparison to the probability threshold.

10. A method according to claim 9, where the probability threshold is at least one of a constant probability threshold and a variable probability threshold.

11. A method according to claim 1, wherein performing a bitwise comparison includes computing an exclusive OR operation.

12. A method according to claim 1, wherein generating a first binary representation includes generating a first binary code based on at least one of latitude, longitude, direction, parcel, ward, street address, town, city, zip code, telephone number, area code, destination, and directional information.

13. A method according to claim 1, wherein generating a second binary representation includes generating a second binary code based on at least one of latitude, longitude, direction, parcel, ward, street address, town, city, zip code, telephone number, area code, destination, and directional information.

14. A method according to claim 6, wherein encrypting at least one of first binary representation and the second binary representation includes altering the precision of at least one of the first binary representation and the second binary representation.

15. A method according to claim 1, where the first uncertainty is based on the accuracy of the first geographic information.

16. A method according to claim 1, where the second uncertainty is based on the accuracy of the second geographic information.

17. A method according to claim 1, where at least one of the first binary representation and the second binary representation include a token.

18. A method according to claim 17, further comprising providing a database of tokens.

19. A method according to claim 17, further comprising categorizing the token.

20. A method according to claim 1, further comprising associating an identity with at least one of the first binary representation and the second binary representation.

* * * * *